United States Patent [19]

Koppelmann

[11] 4,280,202

[45] Jul. 21, 1981

[54] DIGITAL HOMODYNE PROCESSING SYSTEM

[75] Inventor: Roger F. Koppelmann, Canton, Mich.

[73] Assignee: The Bendix Corporation, North Hollywood, Calif.

[21] Appl. No.: 89,930

[22] Filed: Oct. 31, 1979

[51] Int. Cl.³ .............................................. G01S 15/02
[52] U.S. Cl. ..................................... 367/87; 367/135; 343/5 NQ
[58] Field of Search .................... 367/87, 99, 135, 131, 367/901; 343/5 NQ

[56] References Cited

U.S. PATENT DOCUMENTS 3,747,099   7/1973   Wong ............................... 343/5 NQ Primary Examiner—Richard A. Farley
Attorney, Agent, or Firm—Manuel Quiogue; Robert C. Smith

[57] ABSTRACT

A digital homodyne processing system is disclosed and includes a hydrophone, a preamplifier for amplifying the hydrophone output signal, a heterodyne circuit and a low-pass filter for filtering the amplified hydrophone output, and a digital-to-analog converter. The output of the digital-to-analog converter is compared against sine and cosine references and is integrated as a function of the sine and cosine references. The integration results are processed for detection of a coded waveform.

11 Claims, 2 Drawing Figures

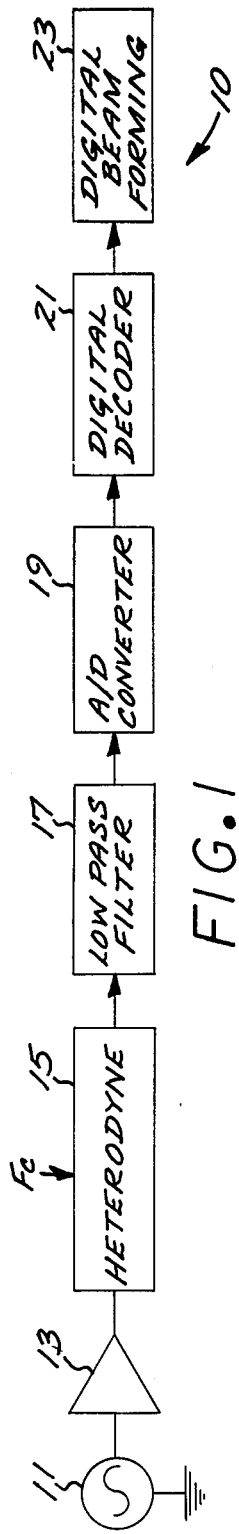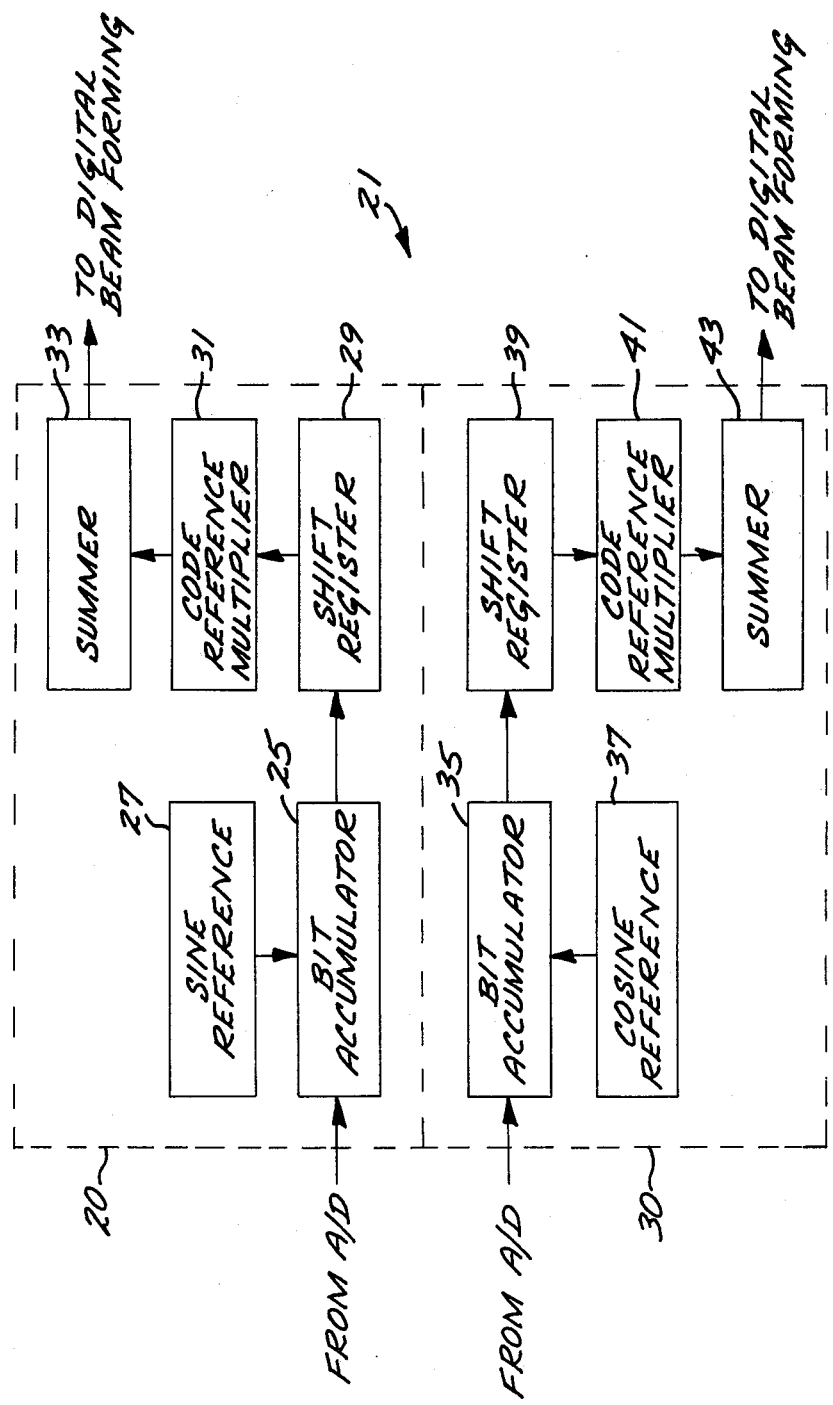

DIGITAL HOMODYNE PROCESSING SYSTEM

BACKGROUND OF THE INVENTION

The disclosed invention relates to the homodyne processor for use in a sonar system. Specifically, the disclosed invention is directed to a homodyne processor which utilizes digital circuitry to perform real-time detection and analysis of received signals which are caused by sonar reflection of a transmitted waveform.

Homodyne circuits in general are utilized for quadrature processing in sonar systems, as exemplified in U.S. Pat. No. 4,119,940 issued to Keating et al on Oct. 10, 1978.

The theoretical aspects of quadrature processing are well known in the art, and therefore will not be discussed extensively herein. However, a brief overview might be helpful. Quadrature processing through the use of homodyne circuitry essentially is used to detect whether the outputs from a hydrophone represent a sonar reflection of a transmitted signal. The use of homodyne circuitry with a sinusoidal reference signal and integration over time effectively results in a bandpass transmission characteristic that is centered at the reference signal frequency and has a bandwidth that is inversely proportional to time duration covered by the integration. What this means is that for uncoded transmission waveforms, a longer transmission results in a narrower bandpass. However, range resolution for uncoded transmission is about one-half of the transmission length; i.e., resolution decreases with transmission length.

Prior art homodyne circuits have utilized analog processing circuitry, and are thus subject to undesirable characteristics associated with analog circuitry. For example, analog homodyne circuits are subject to drift resulting in undesirable, but inevitable, inaccuracies. Further, if prior art analog homodyne circuits are used in parallel, such as in quadrature processing, all parallel homodyne circuits must be matched in terms of performance characteristics and stability. Of course, the inherent drift and variability of analog homodyne circuits necessitates design that compensates for drift and variation.

A critical disadvantage prior art analog homodyne circuits is the delay associated with the processing of analog information, particularly the delay of analog-to-digital conversion of quadrature signals. That processing delay associated with analog circuitry eliminates the possibility of any real-time processing, particularly the decoding of coded waveforms. Of course, analog homodyne circuitry cannot be used for decoding overlapping waveforms.

The processing delay of analog homodyne circuits and the resulting inability to decode coded waveforms precludes improvement of resolution through the use of coded waveforms. As indicated previously, for uncoded waveforms range resolution is inversely proportional to transmission length. Decreasing transmission length would increase range resolution, but would deleteriously effect the effective bandwidth of the homodyne processing circuitry.

The processing delay associated with analog homodyne circuits further precludes continuous processing of the output from a hydrophone.

It is therefore an object of the disclosed invention to provide a homodyne processing system which advantageously utilizes digital circuit components.

Another object of the invention is to provide a homodyne processing system for generating digital outputs that can be analyzed in real-time.

A further object of the invention is to provide a digital homodyne processing system wherein coded waveforms are decoded in real-time.

Still another object of the invention is to provide a homodyne processing system having improved range resolution.

Yet another object of the invention is to provide a homodyne processing system which is capable of continuously examining a hydrophone output and does not utilize range gating.

SUMMARY OF THE INVENTION

The disclosed system includes analog circuitry for filtering the received information signal to the appropriate bandwidth that contains pertinent information. The filtered analog signal is converted into digital form by an analog-to-digital (A/D) converter. The digital signal is integrated in respective accumulators as a function of sine and cosine references, respectively, of the same frequency as the filtered signal that represents a sonar reflection of the transmitted frequency. The digital integration in the accumulators take place concurrently and cover the time period corresponding to the transmission time of one Code bit of a predetermined coded transmission waveform. The accumulator outputs are stored sequentially in corresponding shift registers. The stored values are examined for the presence of pertinent coded information each time respective accumulator outputs are entered into the respective shift registers.

BRIEF DESCRIPTION OF THE DRAWING

The foregoing and other objects, features and advantages of the disclosed invention will readily understood by one skilled in the art from the following detailed description of the disclosure when read in conjunction with drawing wherein:

FIG. 1 is a schematic block diagram of a digital homodyne processor which is responsive to a predefined frequency.

FIG. 2 is a schematic block diagram of the digital decoder shown in FIG. 1 for processing coded waveforms represented by the digital output of analog-to-digital converter shown in FIG. 1.

DETAILED DESCRIPTION OF THE DISCLOSURE

As previously indicated, the subject disclosure deals with the receiving and processing aspects of sonar, and particularly discloses a homodyne processing circuit. Although only the homodyne processing circuit will be described in detail, such description will of necessity refer to the general aspects of sonar which are well known and understood in the art. For example, sonar systems include at least one transmitting transducer that transmits a burst of energy having a predefined frequency and can be coded or uncoded. The duration of the burst of energy is referred to generally as transmission time which may include shorter predefined intervals, such as a code bit transmission time or interval. It is also well known that sonar systems look for sonar reflections of the transmitted burst of energy and will include at least one hydrophone. Typically, a sonar system will not continuously look for sonar reflections of the transmitted burst of energy, but rather through range gating will selectively examine the hydrophone outputs to determine whether any targets at particular distances have reflected the transmitted burst of energy. Since the speed of sound through water is known, range gating involves examining hydrophone outputs after certain times have elapsed after the start of transmission of the burst of energy. Such elapsed times are readily determined by calculating the travel times of the burst of energy from the transmitter to a reflecting target at a particular range, and from the target to the hydrophone. Of course, if no target is present at a particular range, no signal will be outputted by the hydrophone when that particular range is examined.

If the receiving and processing circuitry of a sonar system is sufficiently fast, the sonar system can look for sonar reflections continuously. In such a situation, range will be determined also by elapsed time. Typically, range resolution for uncoded transmitted waveforms is approximately related to one-half of the total transmission time of the energy burst; that is the distance traveled by the burst of energy during a time equal to one-half of the transmission time.

The following describes the operation of the disclosed homodyne system on the premise that a volume of water is insonified with a burst of transmitted energy and that the transmitted energy is reflected and received by a hydrophone. The transmitted energy (and also the reflected energy) comprises a coded waveform of predetermined frequency wherein code bit boundaries are identified by phase reversals.

For purposes of the following description, a valid received signal shall refer to the reflected signal caused by sonar reflection from a target of the transmitted coded waveform. The disclosed homodyne system further continuously examines the insonified water, rather than utilizing range gating.

FIG. 1 shows, in block diagram form, a homodyne processing system 10 for utilization in a sonar system. Particularly, the homodyne processing system 10 includes a hydrophone transducer 11 which senses pressure waves in water and provides as its output an analog electrical signal representative of the pressure waves sensed. The output of the hydrophone transducer 11 is amplified to a useful level by a preamplifier 13. A heterodyne converter 15 heterodynes the preamplifier output against a reference signal of frequency $F_c$, which is lower than the transmitted frequency. The sum and difference signals provided by the heterodyne converter 15 are applied to a low-pass filter 17 to remove noise and the high frequency sum signals. Thus, only the difference signals from the heterodyne converter 15 pass through the low-pass filter 17 to an analog-to-digital (A/D) converter 19. The output of the D/A converter 19 is a digital output that is representative of the pressure wave information received by the hydrophone 11, and is applied to a digital decoder 21 which is described in detail further below. Briefly, however, the digital decoder functions to detect and recognize predefined coded waveforms that are received by the hydrophone 11. The digital decoder 21 further functions to provide to a digital beam forming device 23 coefficients representative of the phase and amplitude of the pressure wavefront represented by the coded waveforms. Digital beam forming devices are well known in the art, and can be generally considered as hard-wired fast-fourier transform devices.

The heterodyne converter 15 and the low-pass filter 17 are used to accomplish several functions. The combination reduces the frequency of the received signal as represented by the output of the preamplifier 13. Also, the combination of the heterodyne converter 15 and the low-pass filter reduces the amount of noise in the signal transmitted to the A/D converter 19. The reduced frequency of the signal applied to the A/D converter reduces the speed requirements of the A/D converter 19. Preferably, the sampling rate of the A/D converter 19 should be at least four times the frequency of the low-pass filter output that represents a valid received signal.

FIG. 2 shows the digital decoder 21 in schematic form. Basically, the digital decoder includes two similar circuits operating in parallel on the information received from the A/D converter 19 (FIG. 1). For reference purposes, the circuit in this top portion of FIG. 2 is identified by the reference numeral 20; and the circuit in the lower portion of FIG. 2 is identified by the reference numeral 30.

The circuit 20 includes a bit accumulator 25 which receives the digital output from the A/D converter 19 (FIG. 1) and either adds or subtracts the A/D output to its accumulated value as a function of the sine reference from a sine reference generator 27. The input from the A/D converter is added if the sine reference is positive; and the input from the A/D converter is subtracted if the sine reference is negative. The sine reference is of the same frequency as the waveform of the signal outputted by the low-pass filter 17 (FIG. 1) which represents a valid received signal.

Since the disclosed homodyne system 10 (FIG. 1) examines the output of the hydrophone 11 continuously, the sine reference provided by the sine reference generator 27 is applied continuously. Of course, if range-gating is utilized, the sine reference generator 27 could be appropriately timed to provide a sine reference waveform that is range gated.

The accumulator 25 is clocked to function during the presence of the sine reference, and adds or subtracts the digital inputs from the A/D converter 19 (FIG. 1) over the time period that corresponds to a code bit in the coded transmitted signal. That is, the accumulator 25 accumulates as determined by the polarity of the sine reference over such time period as defined by the length of a code bit of the predefined coded waveform that is transmitted. The accumulator 25 then provides an output and clears itself. The accumulator output value over a code bit length is transferred to a shift register 29 which serially stores the accumulator output values. Since the shift register 29 is of finite length, when it is full the oldest accumulator output value stored in the shift register 29 is discarded to allow the most recent accumulator output value to be shifted in.

Each code bit may comprise one or more cycles or portions of cycles of a valid received signal; and the accumulator output (provided by the bit accumulator 25) includes a predefined number of binary bits generally referred to as a word. Of course, the choice of code, code bit length, and the number of binary bits used for the accumulator output will depend upon the particular sonar system, as well as the intended application. In general, however, it should be noted the shift register 29 is preferably a two-dimensional array which accepts the binary bits for each output word from the accumulator in parallel and shifts all bits of each word in parallel. Thus, the shift register 29 can be considered as a stack of one-dimensional shift registers with one register corresponding to each binary output bit position from the accumulator 25, and wherein the stack of shift registers shift in parallel each time an accumulator output word is entered.

The contents of the shift register 29 are applied in parallel to a code reference multiplier 31. The code reference multiplier includes code reference values which represent the code bits set forth in a valid received signal. That is, the code reference multiplier includes a series of positive and negative one's arranged in the predefined pattern that comprises the code pattern of a valid received signal. Each positive or negative one represents a code bit and is uniquely associated with a particular word position in the shift register 29 where an accumulator output value can be stored. Each of the values in the shift register are multiplied in parallel with corresponding values in the code pattern of the code reference multiplier 31 with each shift entry of a new value from the accumulator 25. The respective products for each code reference multiplication are summed by a summer 33. The output of the summer 33 is transferred to the digital beam forming device 23 (FIG. 1) for processing.

Since the sine reference generator 27 functions to indicate the polarity of a reference sinusoidal waveform, the sine reference can be a squarewave of unity amplitude and having the same frequency as the output of the low-pass filter 17 (FIG. 1) that represents a valid received signal. Therefore, such a squarewave would be used to identify whether a particular digital output from the A/D converter 19 (FIG. 1) is to be added or subtracted, depending on the polarity of the corresponding portion of this squarewave. Of course, since it is contemplated that the disclosed homodyne processing system continuously examines the hydrophone 11 output, the sine reference as defined by a squarewave waveform will be continuously applied.

The processing circuit 30 functions in the same fashion as the circuit 20, and includes a bit accumulator 35 which is controlled by a cosine reference from a cosine reference generator 37. The cosine reference is the same as the sine reference (provided by the sine reference generator 27) except that it is ninety (90) degrees out of phase with respect to the sine reference. That is, the cosine reference waveform looks just like the sine reference waveform except that the cosine reference is applied to the bit accumulator 35 ninety degrees ahead of the sine reference that is applied to the bit accumulator 25. As with the sine reference, the cosine reference is continuously applied to the accumulator 35 since the disclosed homodyne processing system continuously examines the hydrophone 11 output. Of course, if range gating is utilized, then the cosine reference would be selectively applied concurrently with the application of a gated sine reference.

The polarity of the cosine reference determines whether the input to accumulator 35 is added or subtracted. Particularly, the input from the accumulator is added when the cosine reference is positive; and the input is subtracted when the cosine reference is negative. Since the polarity of the cosine reference is the determining characteristic, an appropriate squarewave waveform can be utilized as the cosine reference in the same manner as described above with respect to the sine reference.

The accumulator 35 accumulates over the time period corresponding to one code bit length synchronously with the operation of the accumulator 25. After the appropriate accumulation period, the total is provided as an output to a shift register 39, and the accumulator clears itself.

The shift register 39 of the bottom circuit 30 is the same as the shift register 29 of the top circuit 20, and operates in the same manner with respect to the outputs from the bit accumulator 35. With each shift entry of a new accumulator output word, all of the stored values of the shift register 39 are multiplied by corresponding code reference values in a code reference multiplier 41. The code reference values for the multiplier 41 are identical to the code reference values for the multiplier 31, and each code value (a positive or negative one) is uniquely associated with a particular word position in the shift register 39 where an accumulator putput value can be stored. The respective products from the multiplication are summed by a summer 43, which in turn provides the sum to the digital beam forming device 23.

As is readily evident, each value stored in the shift registers 29 and 39 (FIG. 2) represents processed information that is based upon pressure waves sensed by the hydrophone 11 (FIG. 1) during an interval of time. That time interval corresponds to the transmission time for one code bit. In terms of distance, one code bit length corresponds to the distance spanned by a code bit waveform at any given instant of time. Thus, each stored accumulator value also represents processed information based upon pressure waves that correspond to particular distance intervals, each interval being determined by code bit length. Range resolution with coded waveforms is therefore a function of code bit length, and not total transmission length.

In the above description, the sine reference and cosine references have been described in terms of their functional relationship to the accumulators 25 and 35, respectively. Effectively, the inputs from the A/D converter 10 (FIG. 1) are compared against the sine and cosine references; and the presence of a valid received signal will result in a large positive or negative values in the accumulator that corresponds to the reference (sine or cosine) that is in phase with the positive code bits received signal. This is readily understood by recalling that the sinusoidal references are applied continuously, and recognizing that a code bits are delineated by phase reversals. For example, if that portion of a valid received signal that represents a positive code bit is in phase with the sinusoidal reference, then the portion of the valid received signal that represents negative code bit will be 180 degrees out of phase with respect to the sinusoidal reference. For the interval of the positive code bit, the accumulator will add all positive A/D outputs and will subtract all negative A/D outputs, resulting in a large positive accumulator output value. For the interval of the negative code bit, the positive A/D output will be subtracted and the negative A/D outputs will be added, thus resulting in a large negative accumulator output value. In essence, the sinusoidal references are used to detect the presence of the frequency component which represents a valid received signal. The results of the comparison are indicated by the accumulator output values.

Therefore, the shift registers may or may not contain values corresponding to valid received signals. The code reference multiplier's 31 and 41 effectively compare the contents of the respective shift registers with the code values. When the contents of a shift register contains values corresponding to a valid received signal and the values line up with the code values, the output of the associated summer (33 or 43) will peak at a large positive value. When the values line up each of the positive shift register values (positive code bits) will be multiplied by a positive one, and each of the negative shift register values (negative code bits) will be multiplied by a negative one. Thus, all products will be positive and also large in value. The outputs of the summers 33 and 43 are indicative of the comparison between the contents of the shift registers 29, 39 and the code values. The outputs of the summers 33, 43 are further representative of the use of sinusoidal references for digital integration and the use of coded waveforms reduces the amount of noise in the signals being processed by the homodyne processing system, and will provide a readily detected peak summer output when a valid received signal lines up with the code values. Further, digital processing and coded waveforms greatly reduces the possibility that noise may be detected as a valid received signal.

Although the foregoing has been a recital of a particular embodiment of the present invention, it will be appreciated by those skilled in the art that changes and modifications can be made without departing from the scope and spirit of the invention which is defined by the following claims.

I claim:

1. A digital homodyne processing system for use in a sonar system which insonifies a volume of water, comprising:
    means for sensing pressure waves including sonar reflections in the isonified volume of water, and for providing a transducer output signal representative of the pressure waves detected by said sensing means;
    filtering means for reducing the frequency and bandwidth of said transducer output signal for removing noise and non-useful signals to facilitate detection of sonar reflections, said filtering means providing a filtered output;
    conversion means for providing a digital output signal representative of said filtered output;
    reference means for providing a sine reference signal and a cosine reference signal;
    first integrating means responsive to said sine reference signal for accumulating over predetermined periods of time positive or negative value of said digital output signal as a function of the polarity of said sine reference signal to provide first accumulated values at the termination of said predetermined periods of time;
    second integrating means responsive to said cosine reference signal for accumulating over said predetermined periods of time positive or negative values of said digital output as a function of the polarity of said cosine reference signal to provide second accumulated values at the termination of said predetermined periods of time; and
    comparison means for storing separate respective sequences of said first accumulated values and said second accumulated values and for comparing said sequences against a predetermined code, said comparison means further providing a first output indicative of the comparison of said first sequence of accumulated values and a second output indicative of the comparison of said second sequence of accumulated values.

2. The digital homodyne processing system of claim 1 wherein said conversion means comprises an analog-to-digital converter.

3. The digital homodyne processing system of claim 1 wherein said reference means provides a first periodic square wave comprising said sine reference signal and a second periodic square wave comprising said cosine reference signal.

4. The digital homodyne processing system of claim 1 wherein said first integrating means comprises a first accumulator that adds the digital output during the presence of a positive sine reference signal and subtracts the digital output during the presence of a negative sine reference signal; and wherein said second integrating means comprises a second accumulator that adds the digital output during the presence of a positive cosine reference signal and subtracts the digital output during the presence of a negative cosine reference signal.

5. The digital homodyne processing system of claim 1 wherein said comparison means comprises:
    first and second storage means for respectively storing said first and second sequences of accumulated values;
    first and second code reference multipliers respectively associated with said first and second storage means for multiplying individual predetermined code values with individual accumulated values in said respective associated storage means; and
    first and second summing means respectively responsive to said first and second code reference multipliers for summing the individual products resulting from the respective code reference multipliers.

6. The digital homodyne processing system of claim 5 wherein each of said first and second storage means comprises a shift register.

7. A digital homodyne processing system for use in a sonar system, comprising:
    digitizing means for providing digital samples representative of the pressure waves in insonified water sensed by the sonar system;
    digital integrating means for integrating said digital samples as a function of the polarity of first and second periodic reference signals phase-shifted with respect to each other, said digital integrating means providing first and second integrated outputs indicative of integration as a function of said first and second reference signals; and
    comparison means for comparing said first and second integrated outputs with a predetermined code pattern, said comparison means providing first and second outputs indicative of the alignment between the predetermined code pattern and said first and second integrated outputs, respectively.

8. The digital homodyne processing system of claim 7 wherein said digitizing means includes a heterodyne circuit and an analog-to-digital converter.

9. The digital homodyne processing system of claim 7 wherein said digital integrating means provides first and second square waves comprising said first and second periodic reference signals.

10. The digital homodyne processing system of claim 7 wherein said digital integrating means includes a first accumulator responsive to said first periodic reference signal and a second accumulator responsive to said second periodic reference signal.

11. The digital homodyne processing system of claim 7 wherein said comparison means comprises:
    first and second storage means for respectively storing sequences of said first and second integrated outputs; and
    means for comparing said stored sequences with said predetermined code pattern.

* * * * *